United States Patent
Kuga

(10) Patent No.: US 6,285,844 B1
(45) Date of Patent: Sep. 4, 2001

(54) IMAGE FORMING METHOD AND APPARATUS WITH AUTOMATIC PAPER SELECTION CAPABILITY

(75) Inventor: Masato Kuga, Kawasaki (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,616

(22) Filed: Feb. 18, 2000

(51) Int. Cl.$^7$ ........................................... G03G 15/00

(52) U.S. Cl. ................................. 399/85; 399/391

(58) Field of Search ................... 271/9, 9.03, 9.06, 271/9.13; 399/23, 82, 83, 85, 361, 369, 370, 376, 378, 391, 393

(56) References Cited

U.S. PATENT DOCUMENTS

| | | | | |
|---|---|---|---|---|
| 5,130,757 | * | 7/1992 | Ito | 399/23 |
| 5,918,088 | | 6/1999 | Rikima | 399/82 |
| 5,991,556 | * | 11/1999 | Yamashita | 399/23 |

* cited by examiner

Primary Examiner—Arthur T. Grimley
Assistant Examiner—Hoang Ngo
(74) Attorney, Agent, or Firm—Foley & Lardner

(57) ABSTRACT

In addition to a parameter commonly used for all printing jobs, a parameter used for each printing job is also set at the performing of the print job. During the performing of the print job, when no available sheet is left, a switching is effected to another sheet supplying tray on the basis of the commonly used parameter and parameter for each printing job. By doing so it is possible to, during the performing of the print job, prevent a switching to a sheet supply tray in which a sheet not wanted by the user is held.

9 Claims, 6 Drawing Sheets

| | |
|---|---|
| ジョブID | |
| サイドカセット | |
| 手差しトレイ | |
| LCF | |
| ペデスタル1段目 | 表紙/裏表紙 |
| ペデスタル2段目 | |
| ペデスタル3段目 | シート |
| 本体カセット上段 | |
| 本体カセット下段 | |

FIG.2

| | |
|---|---|
| サイドカセット | A4-R |
| 手差しトレイ | – |
| LCF | A4 |
| ペデスタル1段目 | A4 |
| ペデスタル2段目 | A3 |
| ペデスタル3段目 | A4 |
| 本体カセット上段 | – |
| 本体カセット下段 | B4 |

FIG.3

IMAGE FORMING METHOD AND APPARATUS WITH AUTOMATIC PAPER SELECTION CAPABILITY

BACKGROUND OF THE INVENTION

The present invention relates to an image forming method applied to an image forming apparatus, such as a digital copier, having not only a copying function but also a facsimile function or printer function.

Conventionally, the digital copier has a scanner, printer, memory, image processing section, etc. The scanner optically reads out a document and converts its image to an electric signal. The image processing section applies a variety of image processing to an image data read out by the scanner. The memory accumulates the image data to which the image processing is applied by an image processing function. The printer subjects the image data which is stored in the memory to a laser electrophotographic process to form an image.

The digital copier thus configured can realize not only a copying function equal to that of an analog copier but also a facsimile transmitting function, facsimile receiving function and printer function. The facsimile transmitting function and facsimile receiving function are realized by having a facsimile communication section connected to a public network. The printer function is realized by having an image communication means relative to a host computer as an external apparatus.

Further, the digital copier has a memory for storing an image. For this reason, it can effectively offer various image edit functions as various paper handling options.

In the case of performing copy processing, a scanner operation and print operation are synchronized in the analog copier. For example, in the case of copying a four-page document, the document sheets are read out in a sequential page order on the analog copier and printing is done on both sides of the two sheets in the sequential page order.

In the digital copier, an image read out by the scanner can be stored in the memory. In the digital copier, the scanner and printer can be operated in a nonsynchronous fashion. In the case of copying a four-page document on both-sides of its sheets, for example, the digital copier reads out the four-page document and store corresponding images in the memory. In the digital copier, those images of pages 3 and 1 are printed on the "surfaces" of two sheets and accumulated in an automatic sheet surface inverting device. Then the digital copier receives the two sheets from the automatic sheet surface inverting device in a surface-inverted fashion and effects printing with the "reverse surfaces" of pages 1 and 3 sheets emerging as 2 and 4 pages, respectively.

In this way, the digital copier can rearrange the document sheets in a sequential printing order by storing the images in the memory. By doing so, the digital copier can effectively utilize the automatic sheet surface inverting device and, in the case of copying a larger amount of document in a larger quantity, exhibit an excellent productivity over the analog copier.

Some digital copier have a print data receiving section. In such a digital copier, a print function can be realized by printing the print data received from an external apparatus via the print data receiving section. Under this print function, various types of sheets can be supplied from a plurality of supplying trays provided in the digital copier. By doing so, the user can supply the sheets with the "surface" and "rear surface" sides being set or insert a special sheet between any given pages.

Further, the digital copier having the print function is often utilized among a plurality of users. In this case, the user selects, at a printing time, a sheet supplying tray (cassette) where a desired sheet is placed. The supplying tray of the digital copier can be selected by designating the sheet size only. In the case of designating the sheet size only, the digital copier searches the supplying trays and selects a designated sheet size. The function of searching/selecting the supplying trays on the basis of the given sheet size is called an "auto-cassette-switching" function.

Further, in the case where a surface or a rear surface is given as a result of printing, the user designates a supplying tray where sheets are placed with the surface or rear surface set. In the case of inserting a special sheet, such as a colored sheet, as a result of printing, the user designates a given supplying tray with a sheet placed as a special sheet.

In the digital copier, as set out above, various kinds of sheets are set in a plurality of supplying trays. At a time of printing, the user selects, from among those supplying trays, a given supplying tray with a desired kind of sheets are placed.

In the case where the sheet size only is designated by the auto-cassette-switching function, the digital copier selects a supplying tray by the designated size only. Even if, therefore, at the operation of the auto-cassette-switching function, the same sheet size is involved, a sheet is supplied with a surface or rear surface up or an unwanted kind of the sheet is supplied, thus presenting a problem. Further, if no sheet is left in the supplying tray to which a surface or rear surface of the sheet is designated or a special sheet is designated, a sheet of the same size will be selected under the operation of the auto-cassette-switching function, thus posing a problem.

BRIEF SUMMARY OF THE INVENTION

In the image forming method having a plurality of sheet supplying trays, as set out above, when any given sheet is designated by its size only, a sheet not wanted by the user is sometimes be supplied to the user. In order to solve this problem, an image forming method is provided which can prevent the supplying of any sheet not wanted by the user and supply only a sheet wanted by the user.

An image forming method of this invention applied to an image forming apparatus having a plurality of supplying trays having an image forming medium, comprising the steps of: storing first attribute information indicating an attribute of each supplying tray shared by all image forming processing and storing second attribute information indicating an attribute relating to each supplying tray for each image forming processing, and, when an image forming processing is performed, selecting a given supplying tray holding the image forming medium on the basis of the first and second attribute information.

An image forming method of this invention applied to an image forming apparatus having a plurality of supplying trays holding an image forming medium, comprising the step of storing first attribute information indicating an attribute of each supplying tray shared by all image forming processing and storing second attribute information indicating an attribute relating to each supplying tray for each image forming processing, when the image forming processing is performed, selecting a given supplying tray having an image forming medium on the basis of the first and second attribute information, and, when, during the performing of the image forming processing, no available image forming medium is left in the selected supplying tray, effecting a switching to any other supplying tray on the basis of the first and second attribute information, said other supplying tray holding the same image forming medium as that in the selected supplying tray.

An image forming apparatus of this invention having a plurality of supplying trays holding an image forming medium, comprising a first memory for storing first attribute information indicating an attribute of each supplying tray shared by all image forming processing, a second memory for storing second attribute information indicating an attribute relating to each supplying tray for each image forming processing, and selecting means for, during the performing of the image forming processing, selecting a supplying tray holding an image forming medium on the basis of the first and second attribute information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be explained below with reference to the accompanying drawing.

Figure 1:
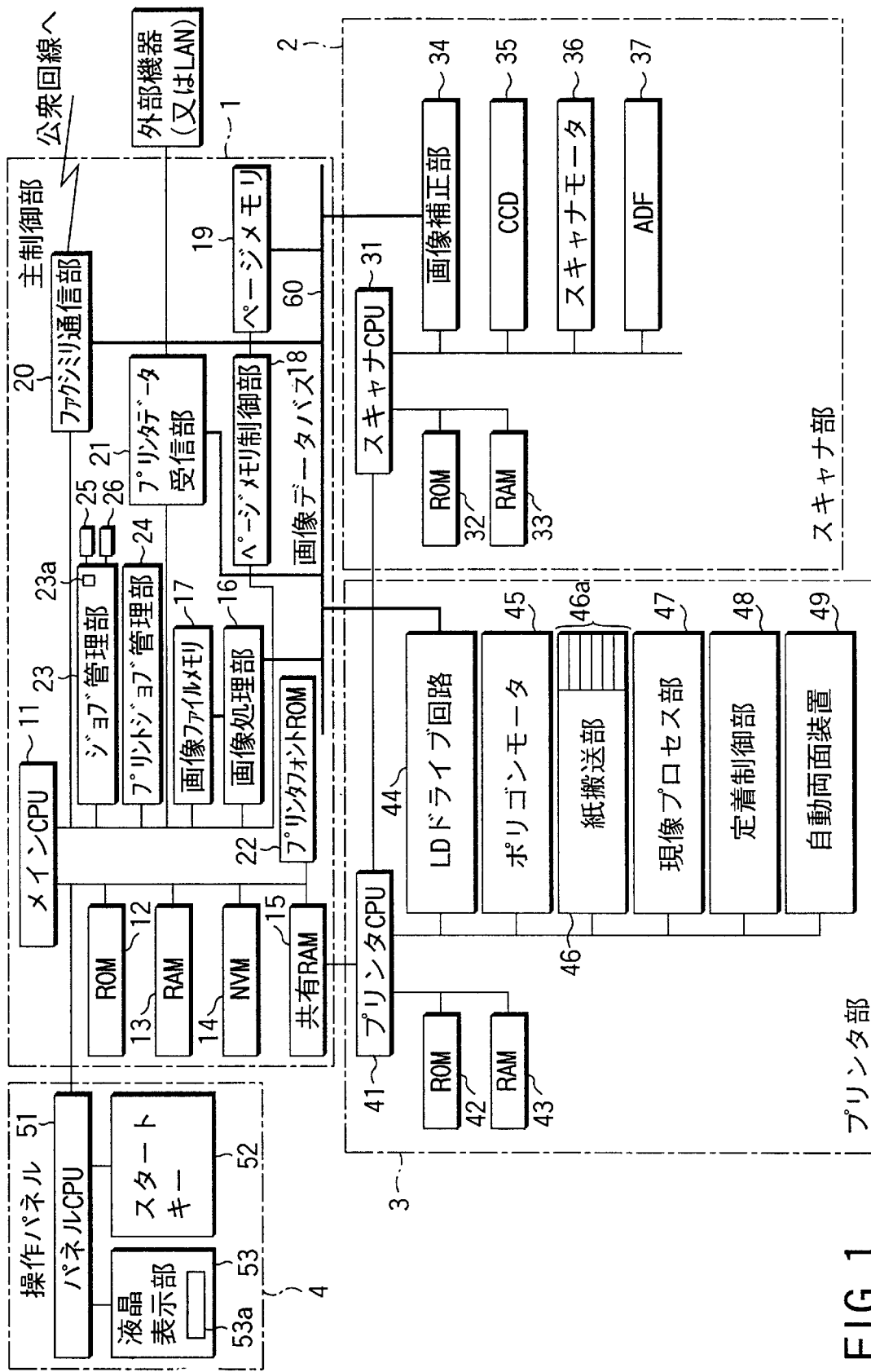
FIG. 1 is a view showing an inner arrangement of a digital copier relating to an image forming apparatus of this invention.

FIG. 1 is a block diagram schematically showing an electrical connection of a digital copier and a flow of signals for control.

As shown in FIG. 1, the digital copier comprises a main controller 1, scanner section 2, printer section 3 and operation panel 4.

The main controller section 1 comprises a main CPU 11, ROM 12, RAM 13, NVM 14, shared RAM 15, image processing section 16, image file memory 17, page memory control section 18, page memory 19, facsimile communication section 20, print data receiving section 21, printer font ROM 22, print job management section 23, job management section 24, table management library 25, shared library 26, etc.

The main CPU 11 controls the whole of the main controller 1. The ROM 12 stores various control programs. The RAM 13 temporarily stores data therein. The NVM (nonvolatile RAM) 14 is comprised of a nonvolatile memory backed up by a battery (not shown). The shared RAM 15 allows a two-way communication between the main CPU 11 and the printer CPU 41.

The image processing section 16 is comprised of an image processing circuit, etc., and performs image processing such as trimming, masking, image compression and expansion, etc. In the image processing section 16, the image data read out by the scanner 2 is compressed and converted to an image file. Further, the image processing section 16 converts image data received by a facsimile communication section 20 or print data receiving section 21 to an image file.

The image file memory 17 stores the image data formed as a file by the image processing section 16. The page memory control section 18 controls the page memory 19. The page memory 19 stores image data read out by the scanner section 2 or image data printed by the printer section 3.

The facsimile communication section 20 allows the transmission and reception of facsimile data via a communication network such as a public network, etc. The facsimile communication section 20 converts the received facsimile data to image data and outputs it to the page memory 19.

The print data receiving section 21 receives print data from an external apparatus such as a personal computer, etc., connected via a printer cable or a local area network (LAN). The printer font ROM 22 stores font data corresponding to code data of a character code, etc.

The print data receiving section 21 develops the print data received from an external apparatus to image data on the basis of the font data of the font ROM 22. This image data is outputted to the page memory 19. The print data comprises code data of a character code, character size, control data such as a resolution, or fit map data, etc.

The job management section 23 manages, for each job, the processing performed by each part. For example, copy processing is managed as a copying job. The copying job comprises a job (scanner job) for reading out a document through the scanner section 2 and job (printing job) for printing the read-out image through the printer section 3.

The print processing of print data received by the print data receiving section 21 is managed as a printer job. The printer job comprises a print data receiving job and print data printing job (print job). The print data receiving job receives print data through the print data receiving section 21 and stores it in the image file memory 17. The print job reads out the image from the image file memory 17 and prints it through the print section 3.

The job management section 23 has a printing queue 23a where an executing printing job is registered. The printing queue 23a allows the printing jobs to be registered in a sequential order. The printing job is executed when it reaches a head of the printing queue 23a.

The printing job management section 24 makes a printing job registration request to the job management section 23 when the printing job occurs.

Further, the table management library 25 and shared library 26 are connected to the job management section 23.

The table management library 25 manages a table where parameters such as setting contents generated for each job are recorded. The shared library 26 stores information on the setting of an already determined values shared among all the jobs.

The functions of the job management section 23, print job management section 24, table management library 25, shared library 26, etc., are performed by the main CPU 11 on the basis of a control program stored in the ROM, etc.

An explanation will be made about the scanner section 2. The scanner section 2 comprises a scanner CPU 31, ROM 32, RAM 33, image correction section 34, CCD sensor (CCD) 35, scanner motor 36, an automatic document feeder (ADF) 37, etc.

The scanner CPU 31 controls a whole of the scanner section 2. The ROM 32 stores a control program, etc. The image correction section 34 comprises a line sensor, A/D conversion circuit, shading correction circuit, gamma correction circuit, etc. The image correction section 34 allows the inputting of an image signal from the CCD 35. The image correction section 34 outputs, to the page memory 19, image data obtained by applying an A/D conversion and correction to an input image signal. The CCD 35 is driven under control of a CCD driver, not shown. The scanner motor 36 has an exposure lamp, mirrors, etc., mounted thereon and drives a document exposure unit, not shown. The ADF 37 feeds document page sheets sequentially to a predetermined read-out position.

An explanation will be made below about the printer section 3. The printer section 3 comprises a printer CPU 41, ROM 42, RAM 43, LD drive circuit 44, polygon motor 45, sheet conveying section 46, develop processing section 47, fixing control section 48, etc.

The printer CPU 41 controls a whole of the printer section 3. The ROM 42 stores a control program, etc. The LD drive circuit 44 controls the light emission of a semiconductor laser (not shown) so as to form an electrostatic latent image on a photosensitive drum (not shown) serving as an image carrier. The polygon motor 45 guides the light from the semiconductor laser to the photosensitive drum. The polygon motor 45 has its rotation controlled by a polygon motor drive circuit (not shown). The sheet conveying section 46 has a plurality of sheet supplying trays (cassettes) 46a, . . . . The respective sheet trays 46a, hold various kinds of sheets as an image forming medium. The sheet conveying section 46 controls the conveying of the sheets from corresponding sheet supplying trays 46a, . . . . The sheet supplying trays 46a, , have a sensor, not shown, for detecting the presence or absence of sheets in the corresponding sheet supplying tray. The develop processing section 47 allows the charging and developing of an image on the photosensitive drum and transferring of the image to the sheet. The fixing control section 48 controls a fixing unit (not shown) for fixing the transferred image to the sheet.

The operation panel 4 comprises a panel CPU 51, start key 52, liquid crystal display section, etc. The panel CPU 51 controls a whole of the operation panel 4. The start key 52 designates the start of copying, start of a facsimile transmission, etc. The liquid crystal display section 53 is comprised of a liquid crystal panel with a touch panel 53a incorporated therein.

An image data path provides a path for allowing the transmission and reception of image data. To the image data path 60 are connected the image processing section 16, page memory 19, facsimile communication section 20, print data receiving section 21, image correction section 34, LD drive circuit 44, etc.

Then an explanation will be made about the various functions of the digital copier thus arranged.

The digital copier has, in addition to the copying function, a facsimile transmitting function, facsimile receiving function and printer function.

The copy processing under the copying function comprises reading out document image through the scanner section 2 and printing the read-out image onto the image forming medium through the printer section 3.

The facsimile transmitting processing under the facsimile transmitting function comprises reading out the document image through the scanner section 2 and transmitting the read-out image through the facsimile communication section 21 to an outside via a communication network. The facsimile receiving processing under the facsimile receiving (printing) function allows data which is received by the facsimile communication section 21 via the public network to be printed through the printer section 3.

The print processing under the printer function allows print data which is received by the print data receiving section 22 to be printed through the printer section 3.

An explanation will be made about the operation of copying the sheets on both sides on the digital copier thus arranged.

A document is set on the ADF 37 by the user. Let it be assumed that the start key 52 is depressed while designating a "both-sides" copying mode. Then the main CPU 11 feeds the document sheet under the ADF 37 and starts document read-out processing.

That is, the main CPU 11 feeds a first document sheet to a read-out position under the ADF 37. The main CPU 11 allows the fed first document sheet to be read out through the scanner section 2 and the thus read-out document image to be formed as an image file. This filed image data is stored as a first page image in the image file memory 17.

When the reading-out of the first document sheet is completed, the main CPU 11 allows a second document sheet to be fed to the reading-out section under the ADF 37. The main CPU 11 allow the fed second document sheet to be read out through the scanner section 2 and the thus read-out document sheet to be formed as an image file through the image processing section 16. The thus filed image data is stored as a second page image in the image file memory 17.

When the reading-out of the second document sheet is completed, the main CPU 11 allows a third document sheet to be fed to the reading-out position. The main CPU 11 allows the fed third document to be read out through the scanner section 2. The main CPU 11 allows thus read-out document image to be formed as an image file in the image processing section 16 and the thus filed image data to be stored as a third page image in the image file memory 17.

When the reading-out of the third document sheet is completed, the CPU 11 allows a fourth document sheet to be fed to the reading-out position. The main CPU 11 allows the thus fed fourth document sheet to be read out through the scanner section 2 and the thus read-out document image to be formed as an image file through the image processing section 16. The thus filed image data is stored as a fourth page image in the image file memory 17. By the above-mentioned processing, the image reading-out processing on all the document images is completed.

When the above-mentioned reading-out processing is completed, the CPU 11 allows the starting of "both-sides" printing processing on the images stored in the image file memory 17.

First, the main CPU 11 searches a sheet supplying tray where a sheet of a given image size or a sheet of a size designated by the user is stored. The main CPU 11 searches a given sheet supplying tray by getting the size of the sheet in the respective sheet supplying tray by the shared library 26. The main CPU 11 elects a sheet supplying tray corresponding to a given sheet on the basis of a result of searching the sheet supplying trays.

The main CPU 11 decides a sequential order according to which the images stored in the image file memory 17 are printed in a "both-sides" printing mode. In the case of the "both-sides" printing against a four-page document, the main CPU 11 decides the printing order as being pate 3→page1→page2→page 4.

In this case, the page 3 is printed on a one-side surface of a first sheet fed from the sheet supplying tray and the page 1 is printed on a one-side surface of a second sheet fed from the sheet supplying tray. The page 2 is printed on the rear surface of the sheet with the page 1 printed on its one-side surface. The page 4 is printed on the rear surface of the sheet with the page 3 printed on its one-side surface. When the printing order is thus decided, the main CPU 11 enables printing to be performed in a printing order.

That is, the main CPU 11 reads out the page 3 image corresponding to the first sheet to be printed in the printing order from the image file memory 17 and develops it on the page memory 19. And the main CPU 11 allows the feeding of the first sheet from a selected sheet supplying tray. The CPU 11 allows the image which is developed on the page memory 19 to be printed on the fed sheet through the printer section. The main CPU 11 allows the sheet with the page 3 printed on its one-side surface to be conveyed to an automatic sheet surface inverting device 49. This page 3 printed sheet is stacked within the automatic sheet surface inverting device.

Then the main CPU 11 reads out the page 1 image corresponding to the second page to be printed in the printing order from the image file memory 17 and develops it on the page memory 19. And the main CPU 11 allows the feeding of the second sheet. The main CPU 11 allows the image which is developed on the page memory 19 to be printed on the fed sheet through the printer section. The main CPU 11 allows the page 1 printed sheet to be conveyed to the automatic sheet surface inverting device 49. The page 1 printed sheet is stacked within the automatic sheet surface inverting device 49.

Then the main CPU 11 reads out the page 2 image corresponding to the third page to be printed in the printing order from the image file memory 17 and develops it on the page memory 19. And the main CPU 11 allows the page 1 image printed sheet which is stacked in the automatic sheet surface inverting device 49 to be inverted and fed. The main CPU 11 allows the image which is developed on the page memory 19 to be printed by the printer section 3 on the sheet supplied from the automatic sheet surface inverting device 49 and to be discharged. By doing so, one sheet with the images copied on both sides is completed such that the pages 1 and 2 are printed on the surface and rear surface sides.

Then, the main CPU 11 reads out the page 2 image corresponding to the fourth page to be printed in the printing order from the image file memory 17 and develops it on the page memory 19. And the main CPU 11 allows the page 3 image printed sheet which is stacked in the automatic sheet surface inverting device 49 to be inverted and supplied. The main CPU 11 allows the image which is developed on the page memory 19 to be printed by the printer section on the sheet supplied from the automatic sheet surface inverting device 49 and to be discharged. By doing so, another sheet with the images copied on both sides is completed such that the pages 3 and 4 are printed on the surface and rear surface sides.

Figure 2:
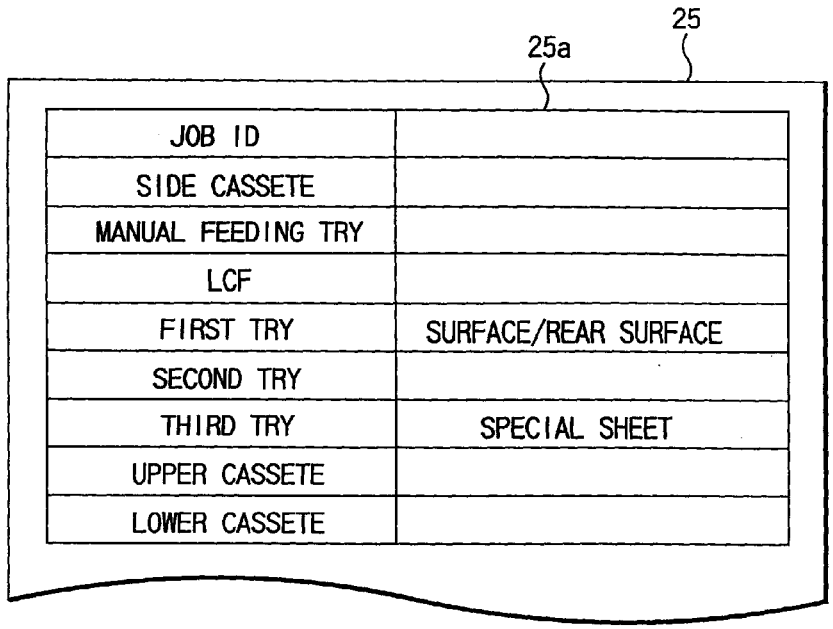
FIG. 2 is a view showing an example of a table managed by a table management library.

FIG. 2 shows an example of a table managed by the table management library 25. As shown in FIG. 2, the table management library 25 stores a table 25a where a parameter set for each job is recorded.

In the example shown in FIG. 2, a table (second memory) 25a is shown where an attribute (second attribute) of the respective sheet supplying tray is provided for each printing job. In this table 25a the parameter is recorded which shows the sheet supplying tray storing the sheet, etc., with the "surface", "rear surface" or "special sheet" set so as to correspond to a job ID given for each job.

The table 25a is prepared based on the setting contents of the respective sheet supplying trays for respective printing jobs generated. For example, let it be assumed that print data is received by the print data receiving section 21. Then the job ID corresponding to the received print data is number-issued. In this case, the table 25a is generated in a way to correspond to the job ID. In the case where the "surface", "rear surface" or "sheet" is set, information showing "surface", "rear surface" or "sheet" is written in the table 25a corresponding to the job ID and is so done in a way to correspond to the respective sheet supplying tray. By doing so, the table 25a is generated which shows the attribute of the respective sheet supplying tray for each printing job.

Then an explanation will be made below about an example of a table stored in the shared library 26.

Figure 3:
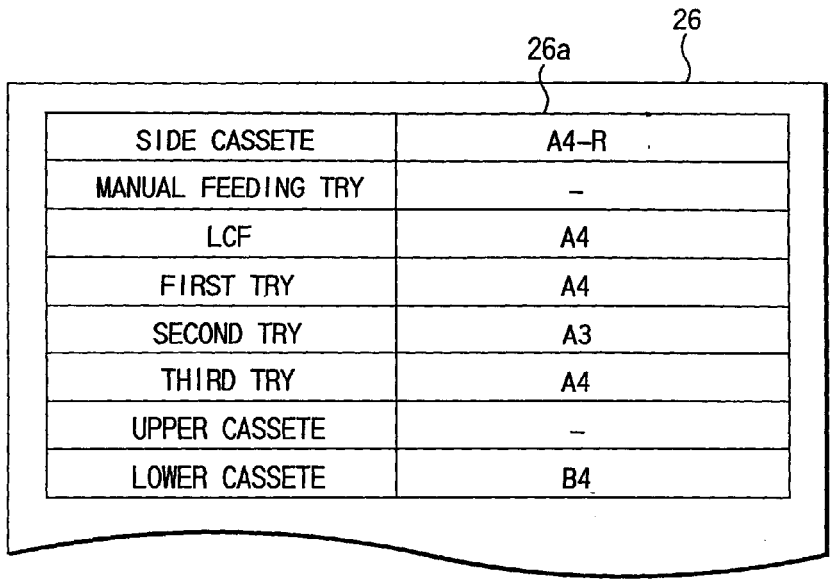
FIG. 3 is a view showing an example of a table stored in a shared library.
Figure 4:
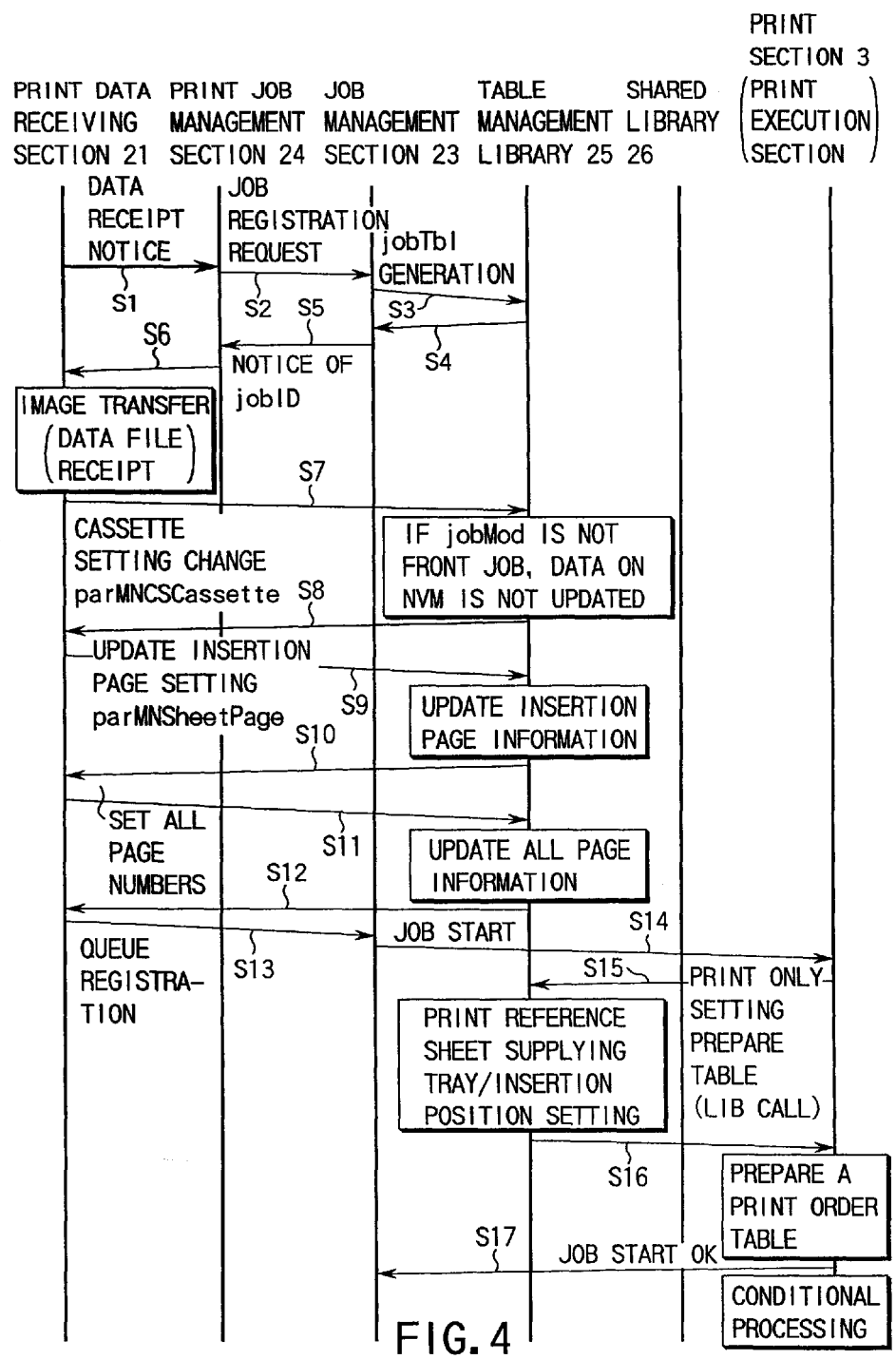
Figure 5:
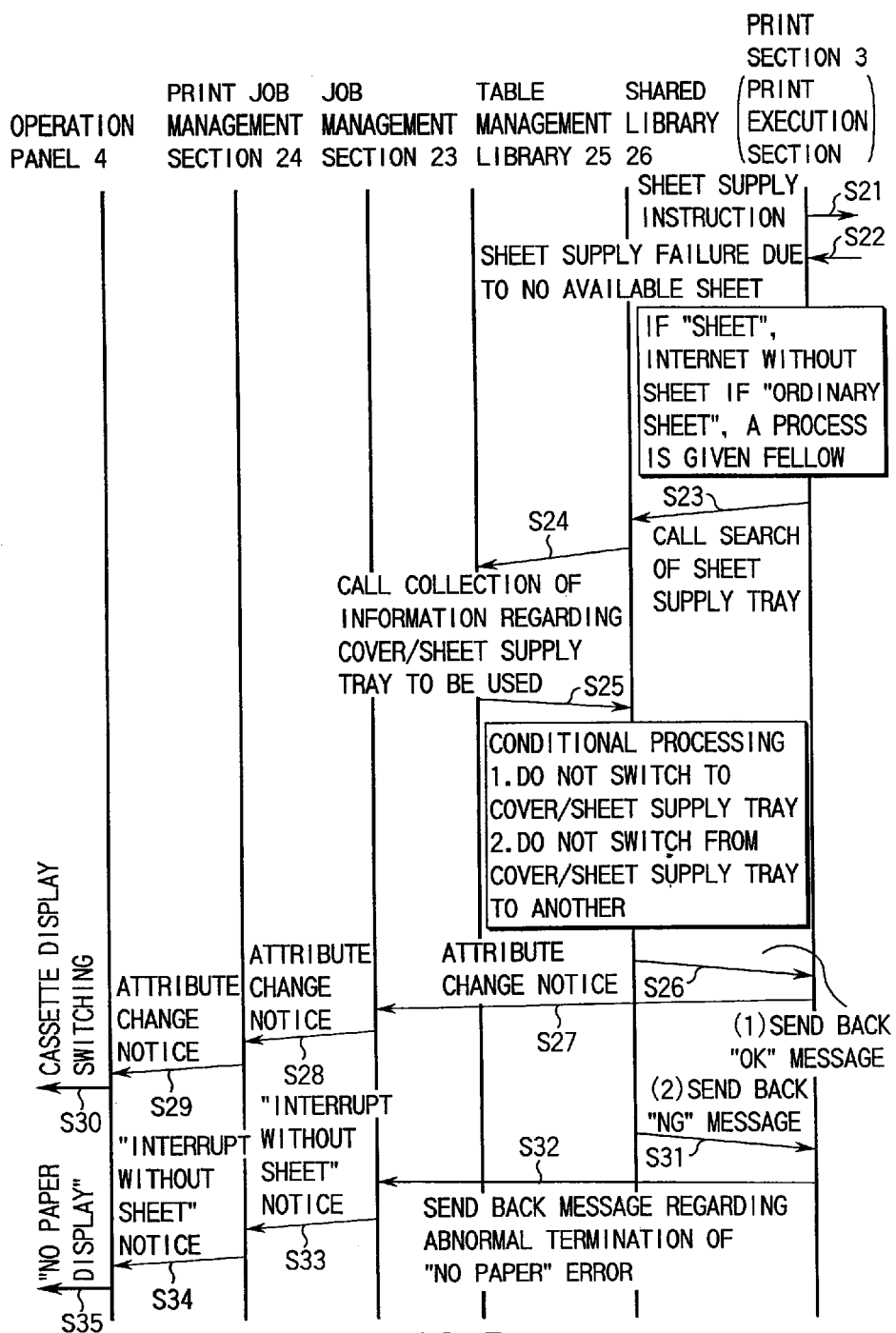
Figure 6:
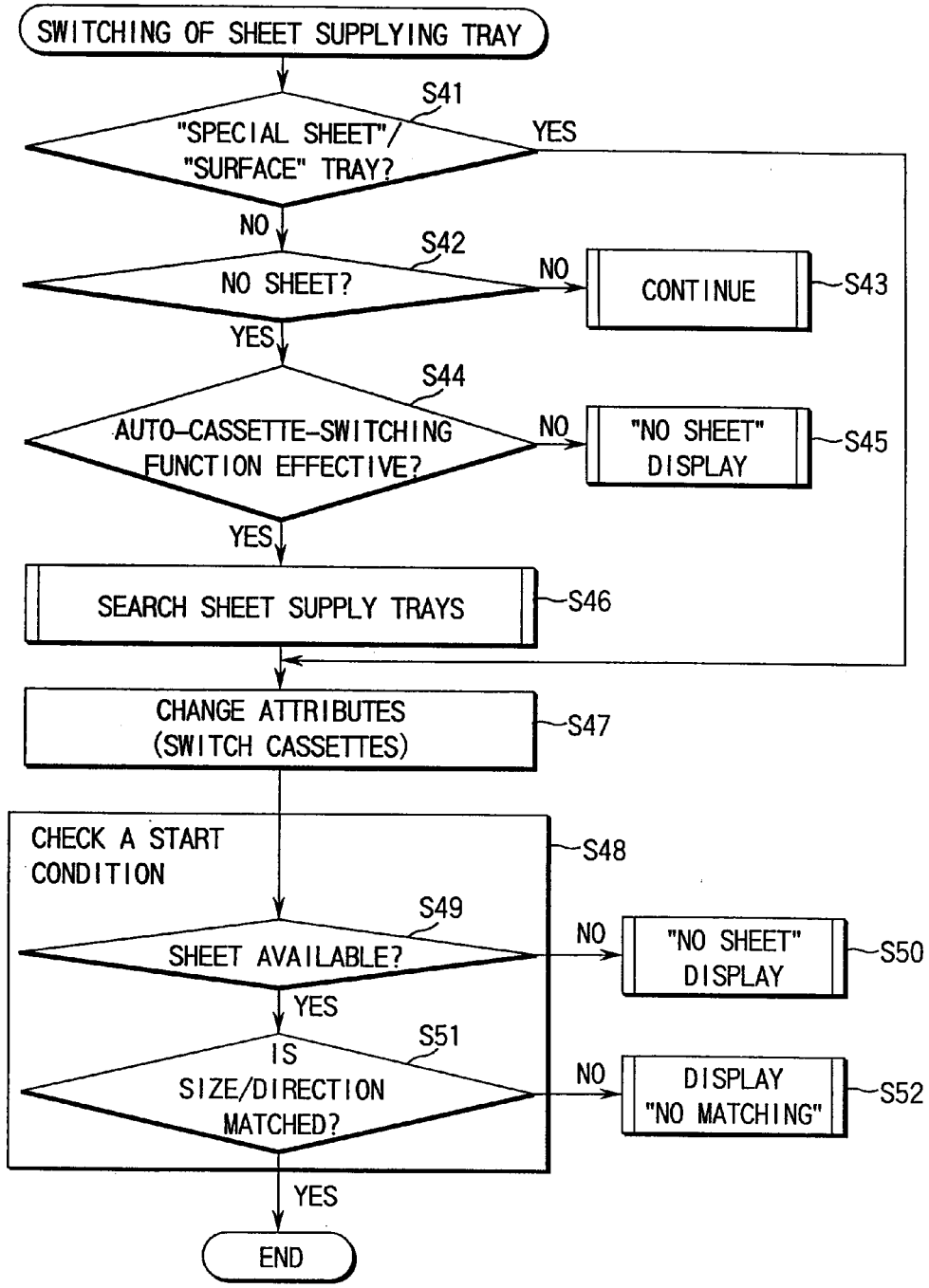
Figure 7:
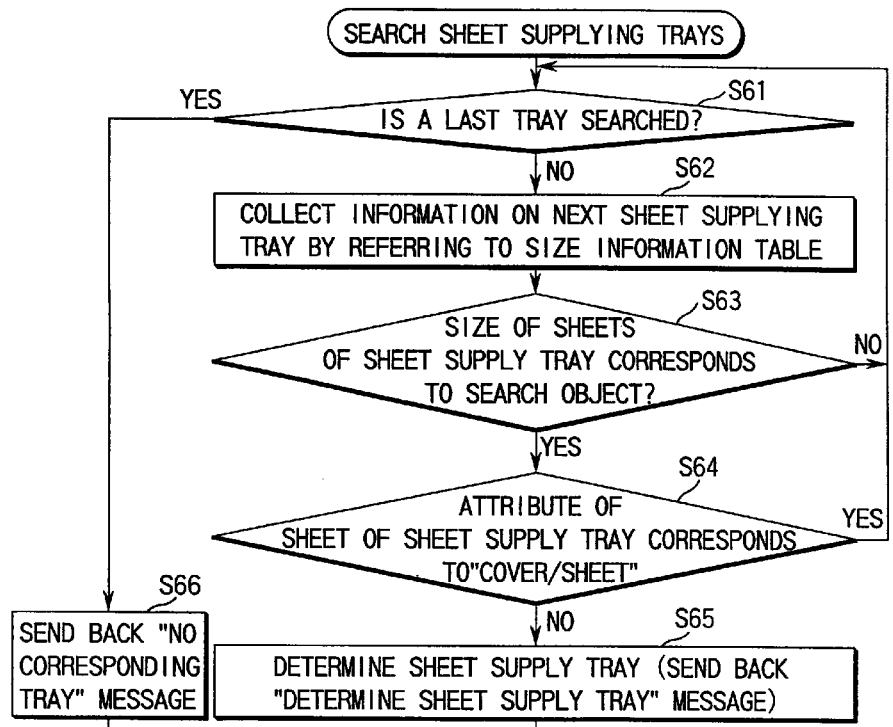
Figure 8:
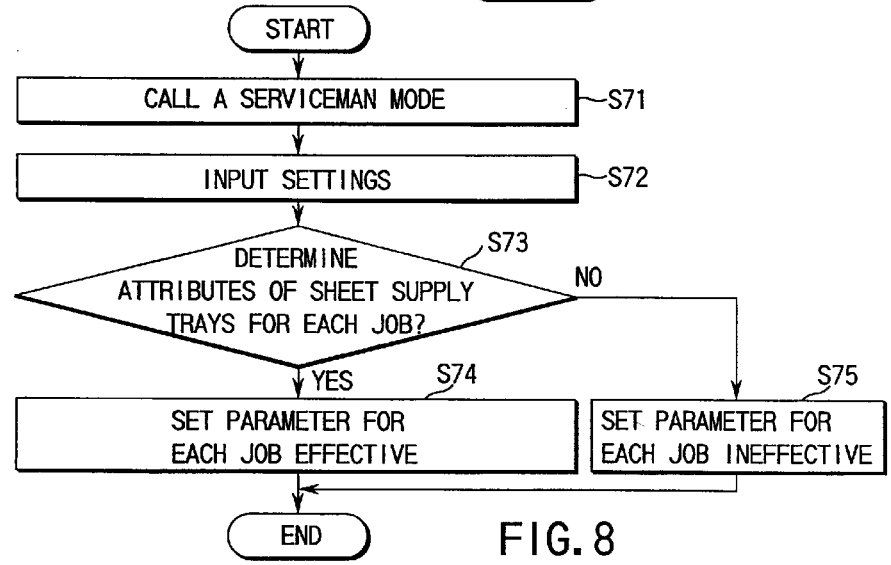

FIG. 3 shows an example of a table 26a showing the size of sheets held in the respective sheet supplying tray. The shared library 26 stores setting information shared among all the printing jobs. In the example shown in FIG. 3, a table (first memory) 26a is shown which shows, as the setting information shared among all the printing jobs, the size (first attribute) of sheets placed on the respective sheet supplying trays. This table 26a is shared among all the printing jobs. In the auto-cassette-switching function, for example, the sheet supplying tray is selected with reference to the table 26a when the sheet supplying tray is searched based on the sheet size.

Then an explanation will be made below about the print processing on print data from the external apparatus.

Figure 4:
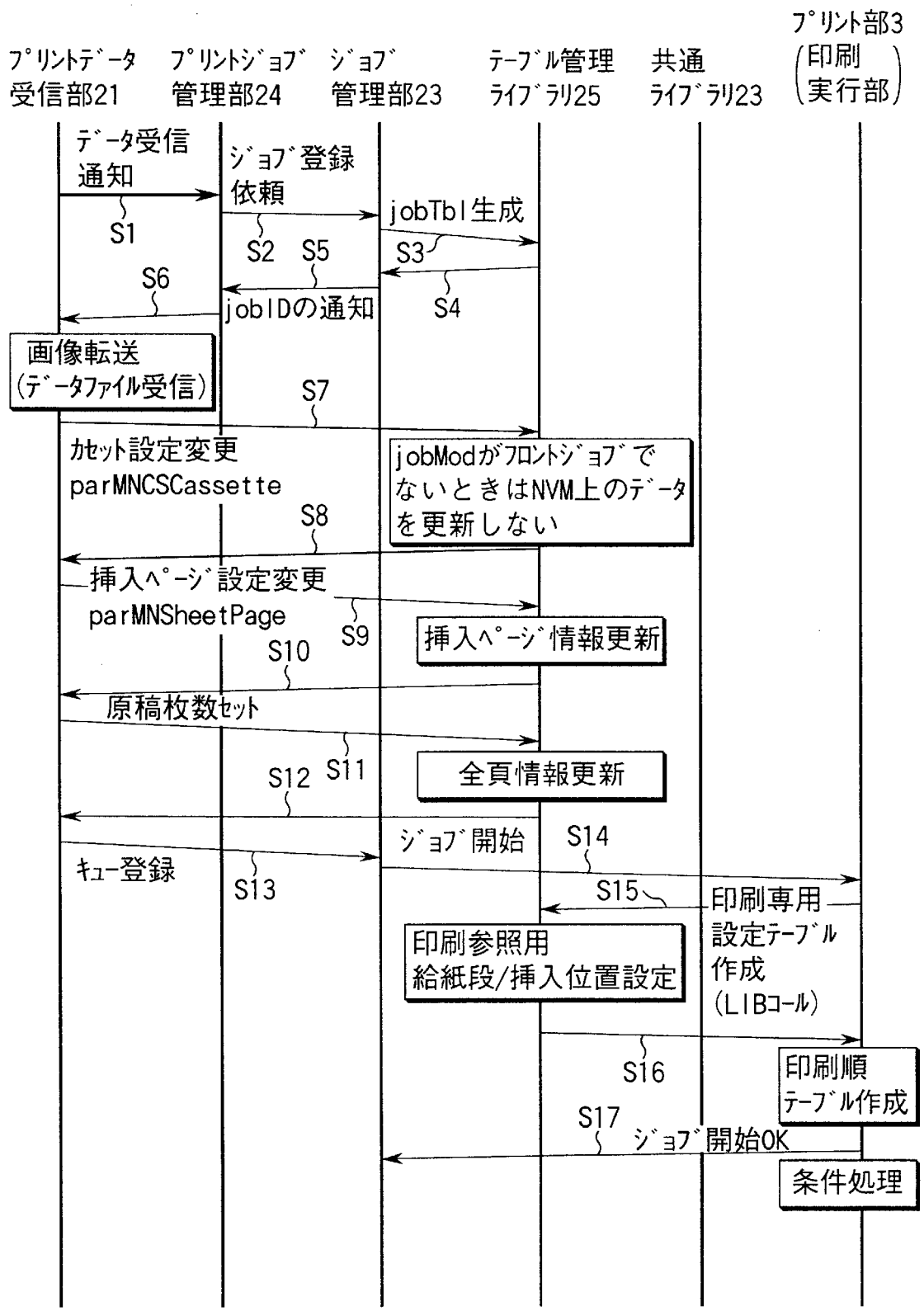
FIG. 4 is a flow chart for explaining an operation involved when print data is printed from an external apparatus.

FIG. 4 is a view for explaining the print processing on the print data from the external apparatus. First, the print data receiving section 21 receives a notice to the effect that print data is received from the external apparatus (host computer). Then, the print data receiving section 21 issues a notice showing that the print data is received as a destination to the print job management section 24 (step S1).

The print job management section 24, receiving such a notice, transmits, to the job management section 23, a message making a request for a job to be registered (step S2). The job management section 23, receiving a job registration request from the print job management section 24, delivers a job number (job ID) and generates a table 25a (step S3).

At this time, the job management section 23 generates, in the table management library 25, the table 25a recording the parameter for executing a registration job and is initialized. When the table 25a is generated in the table management library 25 (step S4), the job management section 23 notifies the number-issued job ID to the print job management section 24 (step S5).

The print job management section 24 notifies, to the print data receiving section 21, the job ID notified from the job management section 23 (step S6). The print data receiving section 21 thus notified starts to receive print data transferred from the external apparatus. The print data transferred from the external apparatus is transferred in a compressed file format. Further, the data designating the sheet supplying tray (cassette) for the "surface", "rear surface" or "special sheet" is transferred together with the print data.

When the print data receiving section 21 completes the receipt of the print data, the main CPU 11 writes the parameter necessary for the job to be performed into the table 25a corresponding to the job ID.

That is, when the print data receiving section 21 receives, together with the print data, the data designating the sheet supplying tray for the "surface", "rear surface" or "special sheet", the main CPU 11 effects the setting of the sheet supplying tray (steps S7, S8). The main CPU 11 changes the setting of the sheet supplying tray on the table 25a corresponding to the job ID in the table management library 25. At this time, in the case where the job is a front job, the content of the NVM 14 is rewritten but, in the case of the job not being the front job, the content of the NVM 14 is not updated.

Further, when the print data receiving section 21 receives the data for designating a page where a special sheet is inserted, the main CPU 11 effects the setting of the page where the special sheet is inserted (steps S9, S10). The main CPU 11 records the information indicative of an inserting page in the table corresponding to the job ID in the table management library 25.

When the print data receiving section 21 receives the document sheet number (image printing page number), the main CPU 11 effects the setting of all the page numbers (steps S11, S12). And the main CPU 11 records the information of all the page numbers in the table corresponding to the job ID in the table management library 25. By doing so, the writing of the parameter into the table 25a is completed.

When the writing of the parameter into the table 25a corresponding to the job ID is completed, the main CPU 11 makes, from the print data receiving section 21 to the job management section, a registration request to the printing queue 23a of the print job (step S13).

The job management section 23 registers, in the printing queue 23a, a printing job requested from the print data receiving section 21. The job management section 23 performs the jobs in a sequential order which are accumulated in the printing queue 23a.

When, at step S13, the registered printing job comes to a head of the printing queue 23a, the job management section 23 issues, together with the job ID, a command for designating a printing start to the printer section (print executing section) 3, step S14.

When the printer section 3 receives the printing start command, the main CPU 11 reads out the table 25a corresponding to the job ID through the table management library 25 (step S15). Based on the parameter on the table 25a, the main CPU 11 effects the setting of a reference table referred to at a time of printing. This table records, as a parameter, the information on the sheet supplying tray for sheets used at a time of printing or on a sheet insertion position, etc. (step S16).

Then the main CPU 11 determines the printing order of the images and prepares a table showing a sequential printing order. Then the main CPU 11 issues a notice to the effect that a start of the job from the printer section 3 to the job management section 23 is in a ready state (step S17). The printer section 3 in that state performs conditional processing under the main CPU 11. The conditional processing is for checking the presence or absence of the sheet in the sheet supplying tray, the sheet size, the direction of the sheet. When this checking is normally ended, the printer section 3 starts the print job.

When the print job other than the above-mentioned copying job is started, its progressing situation is notified to the operation panel 4 in detail. In more detail, the progressing situation is notified from the printer section 3 to the job management section 23. To the operation panel 4, the progressing situation of the print job is notified via the job management section 23.

When a print job starting notice is delivered from the job management section 23 to the operation panel 4, the panel CPU 51 lets the display section 53 display "now printing". When a print job ending notice is delivered from the job management section 23 to the operation panel 4, the panel CPU 51 lets the display section 53 delete the display "now printing" and lets it to be returned back to an initial display state.

At the same time, the job management section 23 deletes from the printing queue 23a, a print job corresponding to a print job ending job ID and deletes the table corresponding to the job ID from the table management library 25.

When the print job is generated as set out above, a table recording not only parameters effective to all the print jobs but also parameters effective to each print job is prepared. By doing so, the print job can be performed with not only the parameter inherent in the apparatus and effective to all the printing job but also the parameter effective to the respective print job only. Therefore, in the case where the setting of the sheet supplying tray is to be changed for a specific printing job only, the user's operation and control in the digital copier becomes easier.

An explanation will be made below about the case where "no available sheet" occurs during the execution of the print job.

Figure 5:
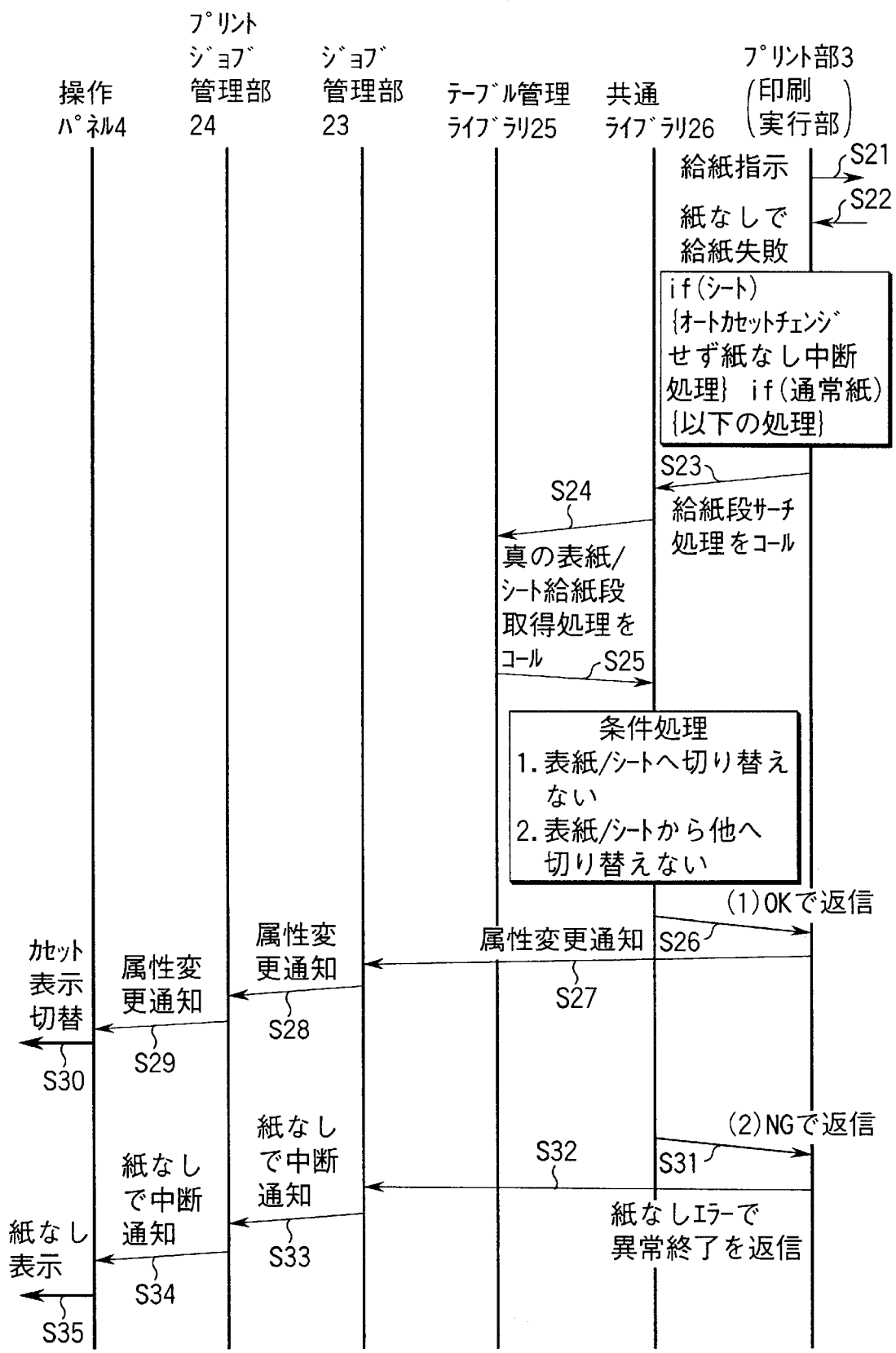
FIG. 5 is a flow chart for explaining an operation involved when no available sheet occurs during the performing of a printing job.

FIG. 5 is a view for explaining an operation involved when no available sheet occurs in the set sheet supplying tray during the execution of the print job. During the execution of the print job the printer section 3 issues a sheet supplying instruction to the sheet supplying section 46 on the basis of the "content" set in the table when the sheet is to be supplied (step S21). When, against the sheet supplying instruction, a notice indicative of "no available sheet" is issued from the sheet supplying section 46 (step S22), the printer section 3 performs a change of the sheet supplying trays under control of the main CPU 11.

Here, the main CPU 11 performs a change of the sheet supplying trays in accordance with the attribute of the sheet supplying tray where "no available sheet" occurs. In the case where no available sheet occurs in the sheet supplying tray where the attribute is set to the "surface", "rear surface" or "special sheet", the main CPU 11 interrupts the execution of the print job by the printer section 3.

In the case where no available sheet occurs in a sheet supplying tray for an ordinary sheet at other than the setting of the "surface", "rear surface" or "special sheet", the main CPU 11 effects a switching to a sheet supplying tray where a sheet of a corresponding size is set. This switching is performed in the case where the auto-cassette-switching function is effective.

First, the main CPU 11 searches a sheet supplying tray having a corresponding size of sheets by the table 26a recorded in the shared library 26 (step S23).

Further, the main CPU 11 reads out, through the printer section 3, a sheet supplying tray for the "surface", "rear surface" and "special sheet" from the table 25a corresponding to the job ID of the table management library 25 (step S24). When the sheet supply tray for the "surface", "rear surface" and "special sheet" (step S25) is read out, the main CPU 11 performs conditional processing for changing the setting of the sheet supply tray.

This conditional processing judges whether or not a switching can be effected to the sheet supply tray searched at step S23. That is, in the case where the sheet supplying tray searched at step S23 is set to the "surface", "rear surface" or "special sheet", it is judged that a switching to that sheet supplying tray is not possible. In the case where the sheet supplying tray searched at step S23 is not set to the "surface", "rear surface" or "special sheet", it is judged that a switching to that sheet supplying tray is possible. About the detail of the searching processing of the sheet supply tray and conditional processing of the sheet supplying tray at steps S23 to S25 an explanation will be made below.

In the case where, as a result of the conditional processing, it is judged that the switching to the sheet supplying tray is possible, the main CPU 11 notifies information indicative of a switchable sheet supplying tray to the printer section 3. The printer section 3 thus notified issues an attribute change notice to the job management section 23 so as to change the attribute of the switching sheet supplying tray. The attribute change notice is delivered from the job management section 23 sequentially to the print job management section 24 and operation panel 4. In the operation panel 4, the sheet supplying tray now in use is displayed on the display section 53. At the receipt of the attribute change notice, the operation panel 4 changes the display content on the display section 53 to a display indicative of the switched sheet supplying tray. By doing so, the digital copier notifies the switched sheet supplying tray to the user.

In the case where, as a result of the above-mentioned conditional processing, it is judged that a switching to the sheet supplying tray is not possible, the main CPU 11 notifies the printer section 3 to the effect that a switching to the sheet supplying tray is not possible. The printer section 3 thus notified interrupts the print job due to no sheet available and notifies the job management section 23 to the effect that an abnormal end occurs due to no sheet available. The "interrupt without an available sheet" notice is delivered sequentially to the job management section 23, print job management section 24 and operational panel 4. Upon receipt of the "interrupt without an available sheet" notice, the operation panel 4 displays, on the display section, a guide indicating that the print job is interrupted without any available sheet. By doing so, the digital copier informs the user that the print processing is interrupted without any available sheet.

Let it be assumed that, for example, a print job is performed under the condition that the sheet size is A4 and that the sheet supplying tray is automatically set. During the performing of the print job it is assumed that there is no available sheet. Then the main CPU 11 search the sheet supplying trays for an A4 size sheet on the basis of the shared library (function group) 26. Then the main CPU 11 judges the sheet supplying tray designated to the "surface", "rear surface" or "special sheet" from the table corresponding to the print job of the table management library 25.

In the case where it is judged that there is a sheet supplying tray for a A4 size sheet which is not a "surface", "rear surface" or "special sheet", the main CPU 11 judges that a switching of a sheet supplying tray is possible. In the case where no A4 size sheet supplying tray is found by searching or a A4 size sheet supplying tray is set to the "surface", "rear surface" or "special sheet", the main CPU 11 judges that a switching of the sheet supply tray is not possible.

In the case of, as set out above, switching a sheet supplying tray during a print job, the switching of the sheet supplying tray is judged by referring to the parameter set for each job. By doing so, during the print job, no sheet supplying tray is switched to one having the same size but having a different kind of sheet.

Further, attribute information is secured relating to the sheet supplying tray set for each printing job not dependent upon the information inherent to the sheet size, etc. When the sheet supplying tray is selected, this is done by referring to the attribute information relating to the sheet supplying tray set for each job. By doing so, in the digital copier shared among a plurality of users, it is possible to effect a switching to the sheet supplying tray intended by the user and to achieve the function of attaching a "surface" or "rear surface" to a result of printing and inserting a sheet to a result of printing.

Then an explanation will be made below about the switching of the sheet supplying tray.

Figure 6:
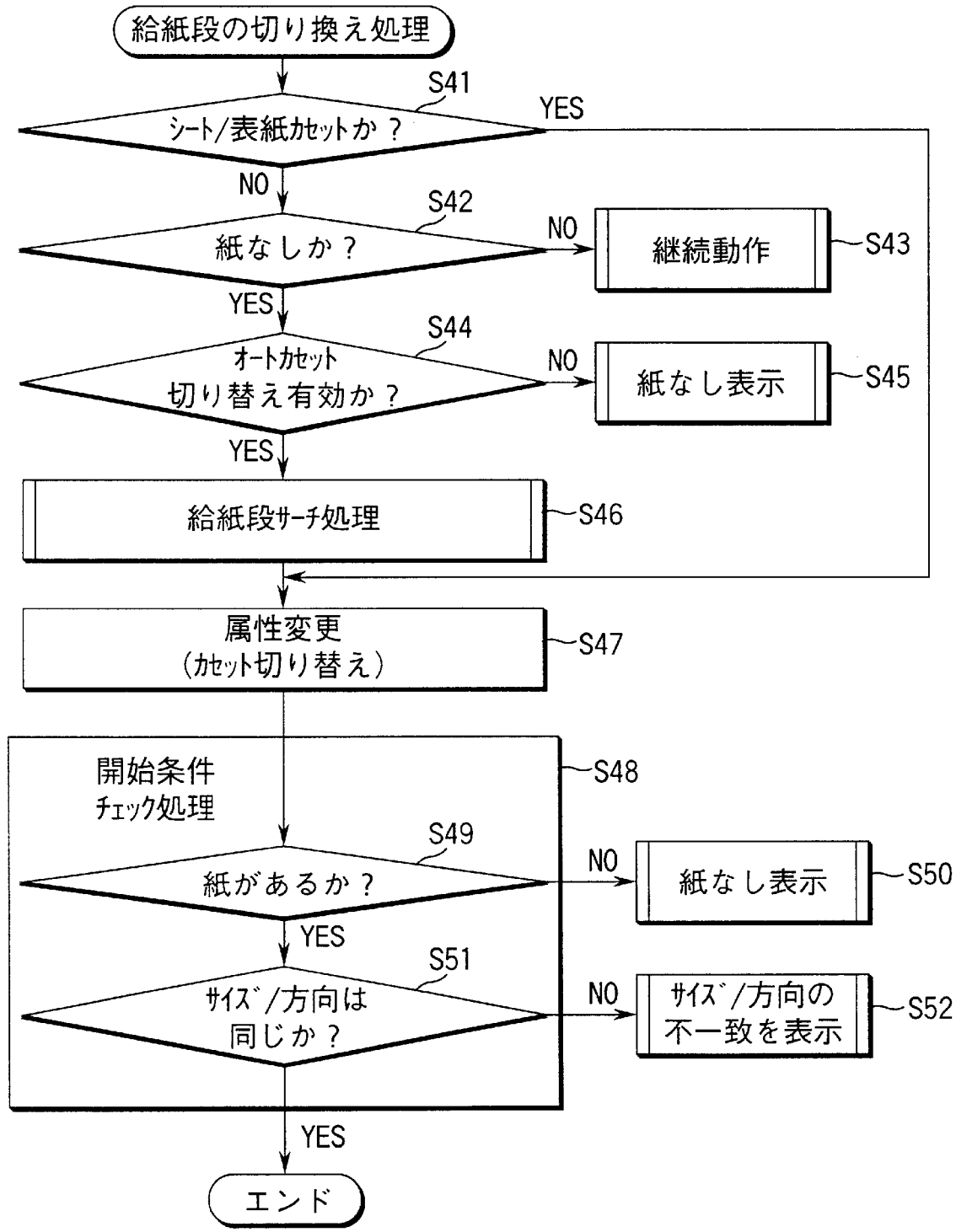
FIG. 6 is a flow chart for explaining a switching of a sheet supplying tray.
Figure 7:
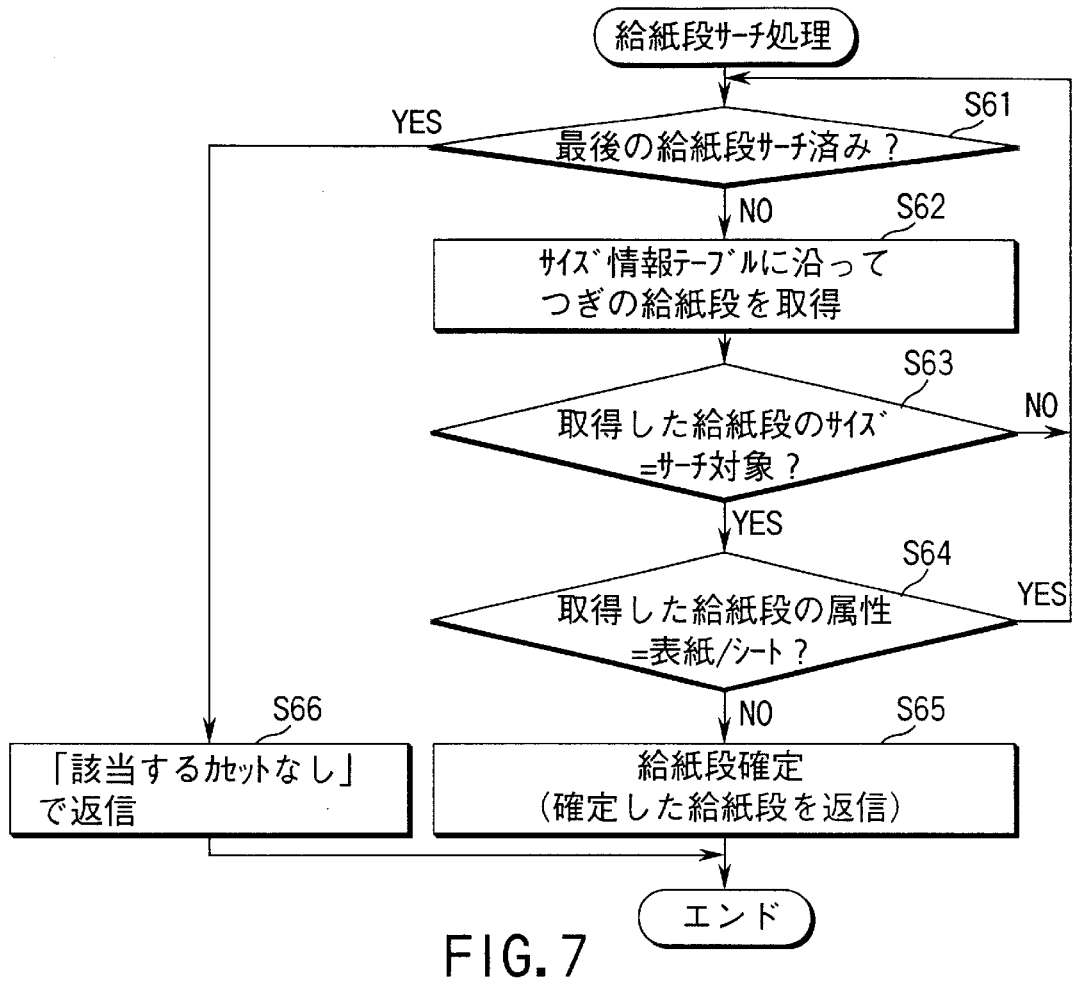
FIG. 7 is a flow chart for explaining a search for a sheet supplying tray.

FIG. 6 is a flow chart for explaining the switching of the sheet supplying tray including the sheet supplying tray for the "surface", "rear surface" or "special sheet".

First, the main CPU 11 judges whether or not the attribute of a selected sheet supplying tray is set to a "surface" or "special sheet" (step S41). In the case where it is judged that the attribute is set to the "surface" or "special sheet", the main CPU 11 judges whether the sheet supplying tray is with or without a sheet (step S42). If it is judged that the tray is with a sheet, the main CPU 11 continues the processing with the sheet supplying tray as it is (step S43).

In the case where it is judged that the sheet supplying tray is without a sheet, the main CPU 11 judges whether or not the auto-cassette-switching function is effective (step S44). In the case where the auto-cassette-switching function is judged to be not effective, the main CPU 11 never effects a switching to any other sheet supplying tray. Therefore, the main CPU 11 judges the sheet supplying tray to be without a sheet and lets the display section 53 on the operation panel 51 display a guide to the effect of "without a sheet" (step S45).

In the case where it is judged that the auto-cassette-switching function is effective, the main CPU 11 effects a search for a later-described sheet supplying tray. In this case, a search is made for the sheet supplying tray for a corresponding size.

As a result of that search, if a given sheet supplying tray is searched, the main CPU 11 changes the attribute of the searched sheet supplying tray and, by doing so, effects a switching to a sheet supplying tray for a sheet to be supplied (step S47). In the case where the sheet supplying tray is set to the "surface", "rear surface" or "special sheet" at step S41, the main CPU 11 changes the attribute of the cassette to the "surface", "rear surface" or "special sheet" (step S47).

When the attribute of the cassette is changed, the main CPU 11 checks the start condition (step S48). The checking of the start condition comprises judging whether or not there is any sheet in a selected sheet supplying tray and there is any matching in the size or direction of the sheet. That is, the main CPU 11 judges whether or not there is any sheet in the sheet supplying tray (step S49). When it is judged that there is a sheet, the main CPU 11 judges whether or not the size and direction of the sheet are matched (step S50). If it is judged that the size and direction of the sheet is matched, the main CPU 11 completes a switching to the sheet supplying tray.

In the case where it is judged that the sheet supplying tray is without a sheet at step S49, the main CPU 11 lets the display section 53 display a guide to the effect of "without a sheet" (step S51). In the case where the size and direction of the sheet are not matched, the main CPU 11 lets the display section 53 display a guide to the effect that the size and direction are not matched (step S52).

Then an explanation will be made below about the searching of the sheet supplying tray.

First, the main CPU 11 judges whether or not there is any sheet supplying tray as an object to be searched by depending upon whether or not all the sheet supplying trays were already searched (step S61). If it is judged that all the sheet supplying trays were not yet searched, then the main CPU 11 reads out the size of the sheet in the next sheet supplying tray along a table 26a showing the sheet size of the shared library 26 (step S62).

The main CPU 11 judges whether or not the read-out size of the sheet on the sheet supplying tray is matched to the sheet size as an object to be searched (step S63). In the case where it is judged that their sheet sizes are matched, the main CPU 11 reads out the attribute of the sheet supplying tray as the object from the table corresponding to the job ID of the table management library 25.

By doing so, the main CPU 11 judges whether or not the attribute of the sheet supplying tray as an object is set to the "surface" or "special sheet" (step S64). If it is judged that the attribute of the sheet supplying tray is not the "surface" or "special sheet", the main CPU 11 decides the sheet supplying tray (step S65).

In the case where it is judged that the sheet size is not equal or the attribute of the sheet supplying tray is the "surface" or "special sheet", the main CPU 11 returns control back to step S61. That is, the main CPU 11 executes a search for the next sheet supplying tray.

The processing from step S61 to step S65 is repeatedly executed relative to the respective sheet supplying tray until a given sheet supplying tray is determined. In the case where at step S61 it is judged that the final sheet supplying tray was searched, the main CPU 11 decides that no corresponding sheet supplying tray is found (step S66).

As set out above, not only the parameter shared among all the print jobs but also the parameter used for each print job when the print job is executed are set. In the case where no available sheet occurs during the execution of the print job, a switching of the sheet supplying tray is done based on the shared parameter and parameter for each print job.

By doing so it is possible to prevent a switching from being made to a sheet supplying tray where an unwanted sheet is held.

It may be possible to effect a switching between the setting of the parameter for each print job as in the table 25a and the setting of only the parameter shared among all the print job without setting the parameter for each print job.

This is because it is convenient to use the parameter of the print job in a way to be shared among all the print jobs. In the case where the kinds of sheets held in the respective sheet supplying trays are initially determined among a plurality of users using a shared digital copier, it is convenient to commonly use the attributes of the sheet supplying trays among all the print jobs. In the case where the sheet supply tray for the "surface", "rear surface" or "special sheet" is initially determined, it is possible to, upon the execution of the print job, save the time and labor of replacing the sheet of the sheet supplying tray for each print job or setting the sheet supplying tray for the "surface", "rear surface" or "special sheet".

In order to handle even the case in which the parameter is desired to be shared among all the print jobs, a switching system is adopted according to which a switching is made between setting the parameter for each print job and commonly using the parameter among all the print jobs. The switching is performed not by the user but by a serviceman having a technical knowledge. The serviceman performs such a switching, by the request of the user, in a serviceman mode operable by the serviceman only.

Figure 8:
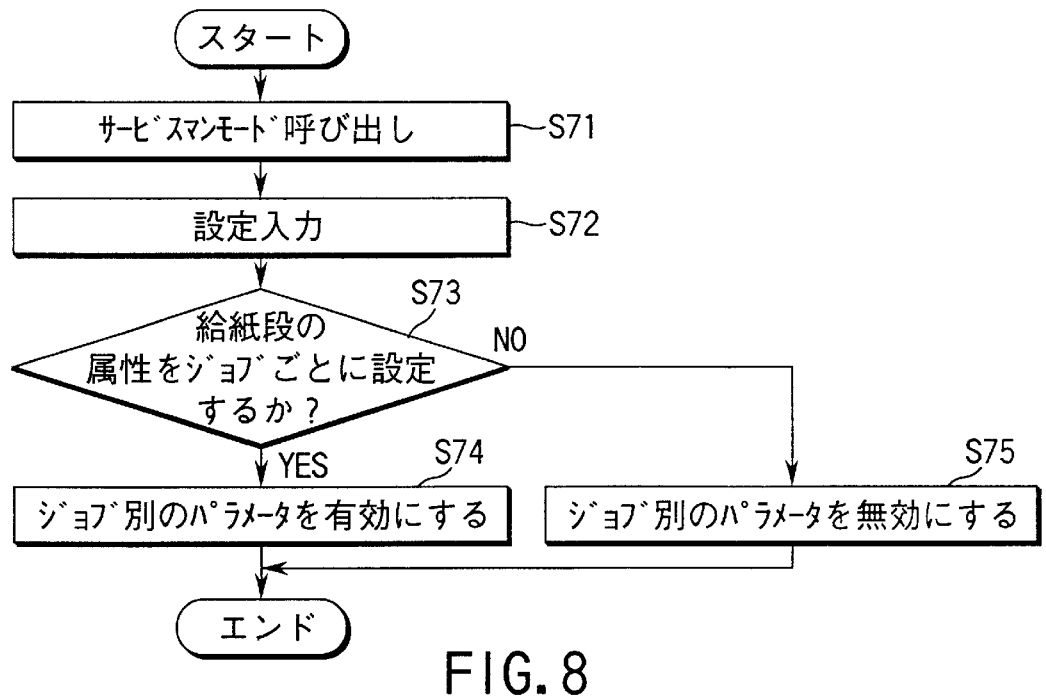
FIG. 8 is a flow chart for explaining a switching by which the setting of each job is made effective or ineffective.
Figure 1:
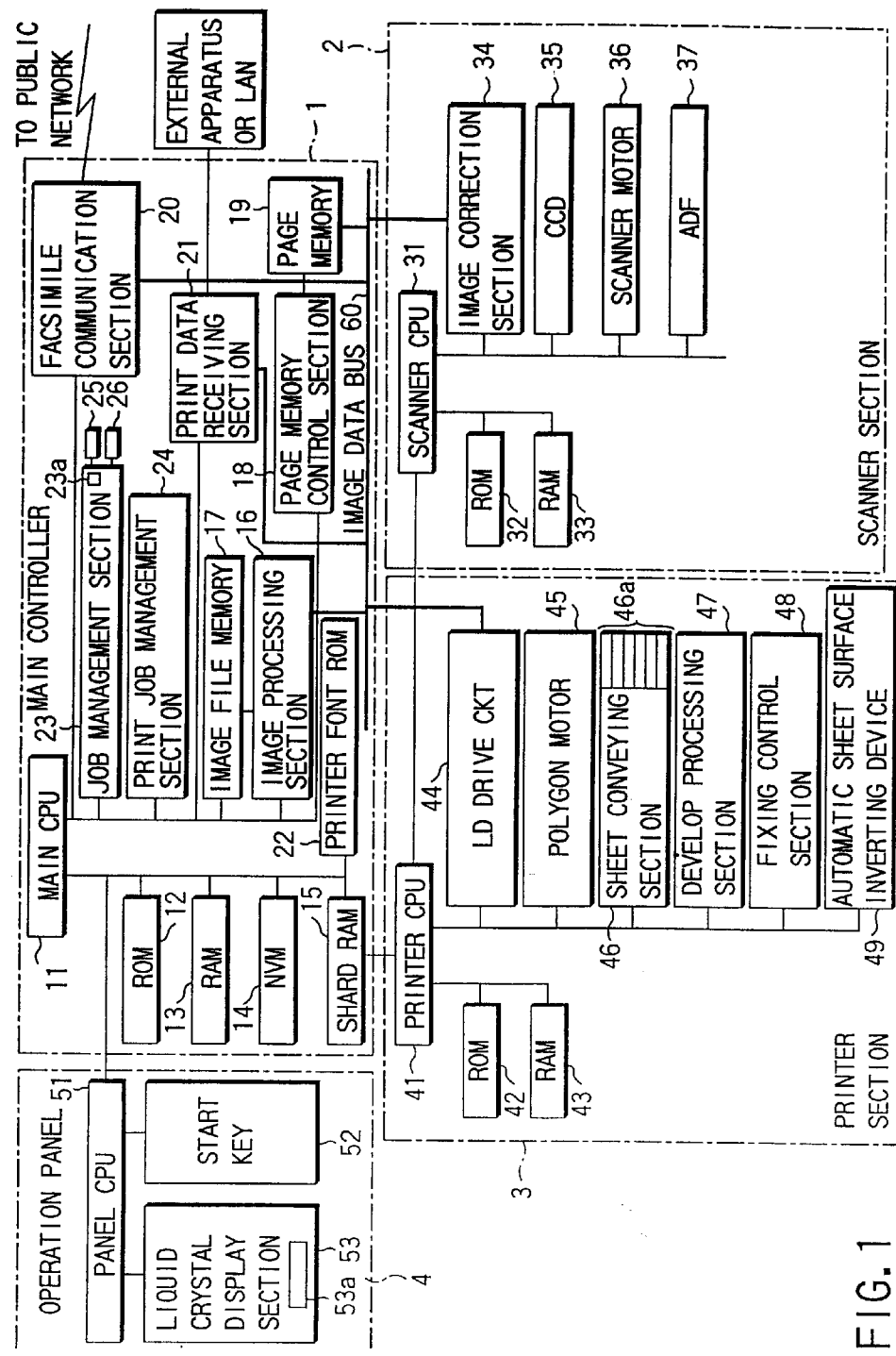

FIG. 8 is a flow chart for explaining an operation of switching the setting of the parameters for the job. That is, at a user's request, the serviceman calls the serviceman mode through a touch panel 53a, etc., provided on the liquid crystal display section 53 (step S71).

When the serviceman mode is called, the serviceman inputs an effective or ineffective operation on the setting of the parameter for each print job (step S72). Then the main CPU 11 judges whether the setting of the parameter for each print job is effective or ineffective on the content of the input (step S73).

In the case where it is judged that the setting of the parameter for each job is effective, the table management library 25 is set effective and the parameter is set for each print job (step S74).

In the case where it is judged that the setting of the parameter for each print job is ineffective, the main CPU 11 makes the table management library 25 ineffective and the setting of the parameter for each job ineffective (step S75).

As set out above, the attribute information of the sheet supplying tray is switched to the parameter common among the print jobs or to the parameter set for each print job. By doing so, a digital copier can be provided which is most efficient in operability and effective to the user in accordance with the operation situation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

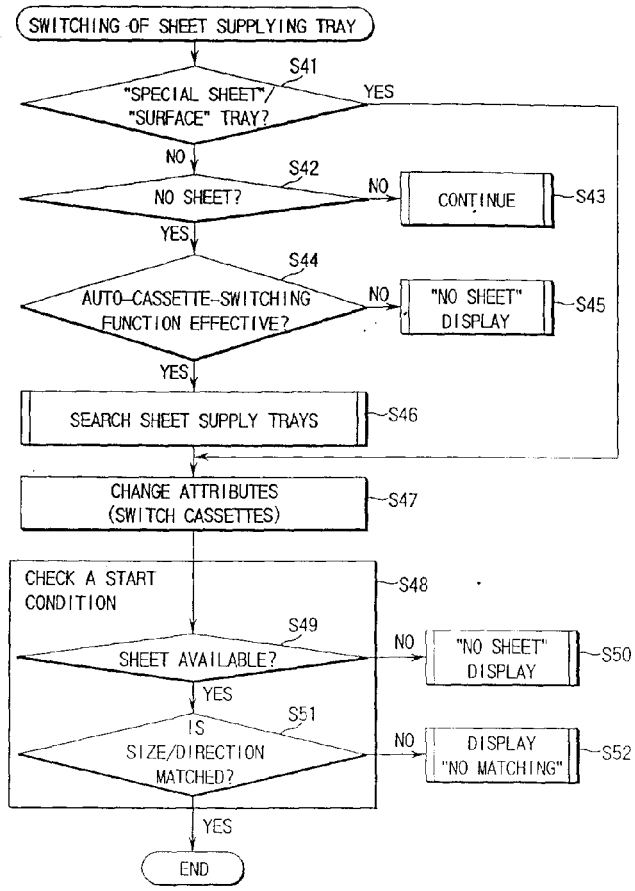

What is claimed is:

1. An image forming method applied to an image forming apparatus which has a plurality of supplying trays holding an image forming medium and which performs image formation for each of a plurality of print jobs, said image forming method comprising the steps of:

causing a managing section to manage said plurality of print jobs;

causing a first memory to store first attribute information indicating an attribute of each supplying tray used in common in all said print jobs managed by the managing section, and causing a second memory to store second attribute information indicating an attribute relating to each supplying tray for each print job, when each print job is to be executed; and, when the image forming processing corresponding to the print jobs managed by the managing section is performed, selecting a given supplying tray holding the image forming medium on the basis of the first attribute information and the second attribute information corresponding to the print job to be executed.

2. An image forming method according to claim 1, wherein the first attribute information is information on the size of the image forming medium.

3. An image forming method according to claim 1, wherein the second attribute information is information on a special image forming medium held as the image forming medium.

4. An image forming method according to claim 1, wherein the second attribute information is information showing a "surface", "rear surface" or "special sheet" as the held image forming medium.

5. An image forming method applied to an image forming apparatus which has a plurality of supplying trays holding an image forming medium and which performs image formation for each of a plurality of print jobs, said image forming step comprising the steps of:

causing a managing section to manage said plurality of print jobs;

causing a first memory to store first attribute information indicating an attribute of each supplying tray used in common in all said print jobs managed by the managing section, and causing a second memory to store second attribute information indicating an attribute relating to each supplying tray for each print job, when each print job is to be executed, when the image forming processing corresponding to the print jobs managed by the managing section is performed, selecting a given supplying tray holding an image forming medium on the basis of the first attribute information and the second attribute information corresponding to the print job to be executed; and, when, during execution of the print jobs, no available image forming medium is left in the selected supplying tray, effecting a switching to any other supplying tray on the basis of the first attribute information and the second attribute information corresponding to the print job to be executed, said other supplying tray holding the same image forming medium as that in the selected supplying tray.

6. An image forming method according to claim 5, wherein, when the switching is effected, a notice indicating that a switching is effected to any other supplying tray is issued.

7. An image forming method according to claim 5, wherein, when there is no available supplying tray holding the same image forming medium as that in the selected supplying tray, a notice is issued to the effect that there is no available image forming medium present.

8. An image forming apparatus which has a plurality of supplying trays holding an image forming medium and which performs image formation for each of a plurality of print jobs, said image forming apparatus comprising:

a managing section that manages said plurality of print jobs;

a first memory for storing first attribute information indicating an attribute of each supplying tray used in common in all said print jobs managed by the managing section;

a second memory for storing second attribute information indicating an attribute relating to each supplying tray for each print job, when each print is to be executed; and, a controller for selecting a supplying tray holding an image forming medium on the basis of the first attribute information and the second attribute information corresponding to the print job to be executed.

9. An image forming apparatus according to claim 8, further comprising setting means for setting the second attribute information stored in the second memory effective or ineffective.

\* \* \* \* \*

UNITED STATES PATENT AND TRADEMARK OFFICE
CERTIFICATE OF CORRECTION

PATENT NO. : 6,285,844 B1
DATED : September 4, 2001
INVENTOR(S) : Masato Kuga

It is certified that error appears in the above-identified patent and that said Letters Patent is hereby corrected as shown below:

The title page should be deleted and substitute therefore the attached title page as shown on the attached page.

Drawings,
Replace Japanese Language Figures 1 through 8 with the enclosed English Language Figures 1 through 8.

Signed and Sealed this

Seventeenth Day of August, 2004

JON W. DUDAS
*Acting Director of the United States Patent and Trademark Office*

(12) United States Patent
Kuga

(10) Patent No.: US 6,285,844 B1
(45) Date of Patent: Sep. 4, 2001

(54) IMAGE FORMING METHOD AND APPARATUS WITH AUTOMATIC PAPER SELECTION CAPABILITY

(75) Inventor: Masato Kuga, Kawasaki (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/506,616

(22) Filed: Feb. 18, 2000

(51) Int. Cl.⁷ .................................................... G03G 15/00

(52) U.S. Cl. ................................................ 399/85; 399/391

(58) Field of Search ........................... 271/9, 9.03, 9.06, 271/9.13; 399/23, 82, 83, 85, 361, 369, 370, 376, 378, 391, 393

(56) References Cited

U.S. PATENT DOCUMENTS

| | | | |
|---|---|---|---|
| 5,130,757 | * 7/1992 | Ito | 399/23 |
| 5,918,088 | 6/1999 | Rikima | 399/82 |
| 5,991,556 | * 11/1999 | Yamashita | 399/23 |

\* cited by examiner

Primary Examiner—Arthur T. Grimley
Assistant Examiner—Hoang Ngo
(74) Attorney, Agent, or Firm—Foley & Lardner

(57) ABSTRACT

In addition to a parameter commonly used for all printing jobs, a parameter used for each printing job is also set at the performing of the print job. During the performing of the print job, when no available sheet is left, a switching is effected to another sheet supplying tray on the basis of the commonly used parameter and parameter for each printing job. By doing so it is possible to, during the performing of the print job, prevent a switching to a sheet supply tray in which a sheet not wanted by the user is held.

9 Claims, 6 Drawing Sheets